(No Model.)
E. A. WALKER.
FEED SCREW AND NUT.
No. 454,959. Patented June 30, 1891.
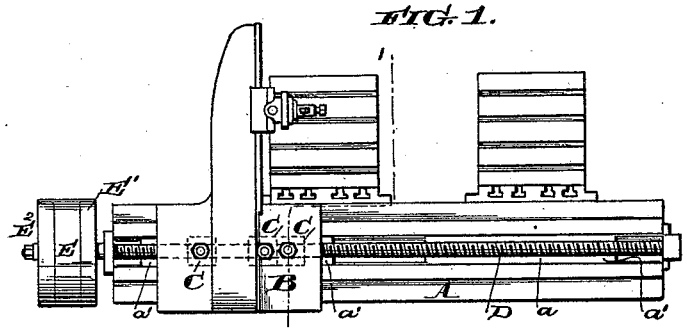
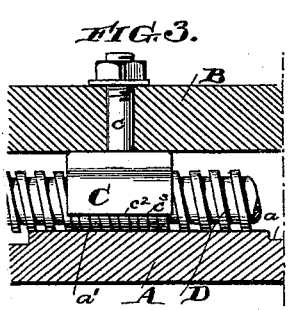
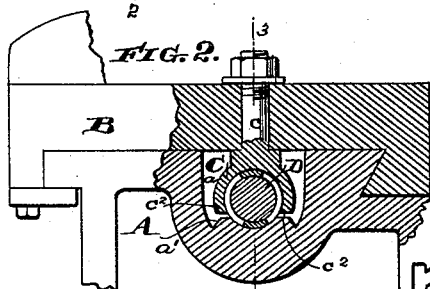
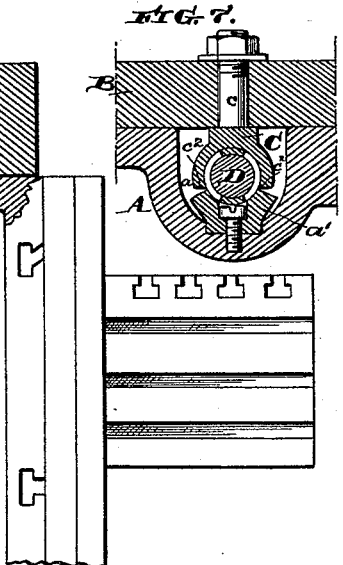
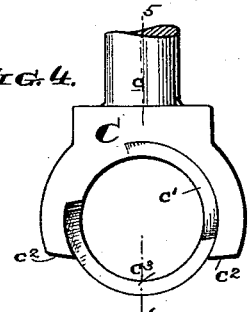
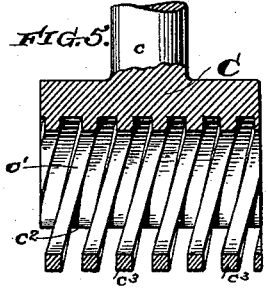
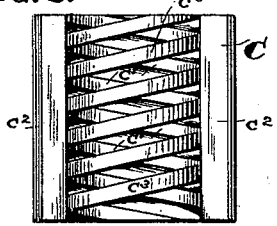
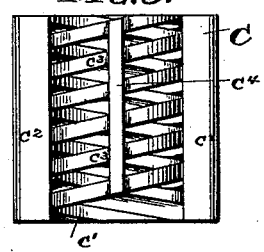
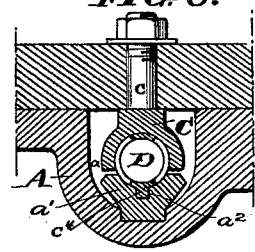
Witnesses:
Inventor:
Edward A. Walker

UNITED STATES PATENT OFFICE.

EDWARD A. WALKER, OF PHILADELPHIA, PENNSYLVANIA.

FEED-SCREW AND NUT.

SPECIFICATION forming part of Letters Patent No. 454,959, dated June 30, 1891.

Application filed October 1, 1890. Serial No. 366,777. (No model.)

*To all whom it may concern:*

Be it known that I, EDWARD A. WALKER, of the city and county of Philadelphia, State of Pennsylvania, have invented a certain new and useful Feed-Screw and Nut, of which the following is a true and exact description, reference being had to the accompanying drawings, which form a part of this specification.

My invention relates to feed-screws and nuts used in machines as planers to cause the table or tool-holder to travel over the frame; and my object is to so construct and arrange such devices that they shall be stronger and better fitted and held together than in the usual constructions. My invention relates particularly to the screw-feeds, in which the feed-screw lies in a horizontal plane, and to prevent sagging is supported upon a rest or rests beneath it. With screws so supported it has heretofore been customary to use a yoke-like nut, which straddled the upper part of the screw and engaged only its top and sides, and such a device is obviously less strong and more liable to displacement and uneven wear than a nut which embraces the whole circumference of the screw.

The chief feature of my device consists in using with the feed-screw a nut, the outer thickness only of which is cut away in part to clear the face of the screw-threads, while the threads of the nut are continuous and uninterrupted. Where the screw lies upon rests the nut is thus cut away to clear said rests, and at the same time it embraces the whole circumference of the screw and is held firmly in place thereon. This and the other features of construction which I desire to protect by Letters Patent are illustrated in the drawings, in which—

Figure 1 is a plan view of a planer having my improved device; Fig. 2, an enlarged cross-section on the line 1 2 of Fig. 1; Fig. 3, a longitudinal section on the line 3 4 of Fig. 2; Fig. 4, an end view of the nut; Fig. 5, a longitudinal section of the nut on the line 5 6 of Fig. 4; Fig. 6, a bottom view of the nut; Fig. 7, a view showing the feed-screw supported on detachable and adjustable guides; Fig. 8, an end view, showing a modification in construction; and Fig. 9 a bottom view of the modified nut.

A is the bed-plate of the machine, along which is formed a longitudinal groove $a$ for the feed-screw to work in.

$a'$ $a'$, &c., are rests formed in the bottom of groove $a$ to support the screw. These rests may be planed out of the bed-plate, as shown in Figs. 2 and 3; but preferably I form them separately and secure them to the bed-plate as in Figs. 7 and 8, so that they can be adjusted to compensate for wear.

B is the table of the planer, to which are secured any number of feed-nuts C C, &c.

D is the feed-screw, journaled to the bed-plate and supported by the rests $a'$.

$E'$ $E^2$ are loose pulleys secured to screw D, and E a fast pulley situated between them.

The nuts C are secured to the table in any convenient way, as by extensions $c$. They are provided with internal threads $c'$, fitting on the thread of screw D, and their outer thickness is cut away between the shoulders $c^2$ $c^2$, so as to clear the rests $a'$, but leave the thread uninterrupted and continuous, as is shown at $c^3$. Where the rests $a'$ are broad I prefer to form them with longitudinal slots $a^2$, (see Fig. 8,) and I also leave or form on the nut a rib $c^4$, arranged to fit in the groove, and which connects the free portions $c^3$ of the thread of the nut together, (see Fig. 9,) stiffening and strengthening the thread.

Having now described my invention, what I claim as new, and desire to secure by Letters Patent, is—

1. The combination of a feed-screw with a nut having a portion of its outer thickness cut away to clear the outer surface of the screw-thread, but its thread uninterrupted and continuous, substantially as and for the purpose specified.

2. The combination of a feed-screw, a rest or rests arranged to support said screw, and a nut, as C, having a portion of its outer thickness cut away to clear the outer face of the screw-thread where it is in contact with the rest, but its thread uninterrupted and continuous, substantially as and for the purpose specified.

3. The combination of a feed-screw, a rest or rests arranged to support said screw and formed with one or more longitudinal slots, and a nut, as C, having a portion of its outer thickness cut away to clear the guides, its thread uninterrupted and continuous, and one or more strengthening-ribs $c^4$ connecting the threads of the nut and formed to fit into the longitudinal grooves of the rests, all substantially as and for the purpose specified.

4. The combination of a machine-table A, an adjustable rest or rests $a'$ secured thereto, a feed-screw supported on said rests, and a nut having its outer thickness cut away to clear the rests, and its thread formed continuous and uninterrupted, substantially as and for the purpose specified.

EDWARD A. WALKER.

Witnesses:
GEORGE HOUSE,
JOSHUA MATLACK, Jr.